(12) United States Patent
McCann

(10) Patent No.: US 9,930,528 B2
(45) Date of Patent: *Mar. 27, 2018

(54) METHODS, SYSTEMS, AND COMPUTER READABLE MEDIA FOR PROVIDING ACCESS NETWORK SIGNALING PROTOCOL INTERWORKING FOR USER AUTHENTICATION

(71) Applicant: Oracle International Corporation, Redwood Shores, CA (US)

(72) Inventor: Thomas Matthew McCann, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,503

(22) Filed: Apr. 28, 2017

(65) Prior Publication Data

US 2017/0238178 A1    Aug. 17, 2017

Related U.S. Application Data

(62) Division of application No. 14/827,025, filed on Aug. 14, 2015, now Pat. No. 9,668,135.

(51) Int. Cl.
  *H04M 1/66* (2006.01)
  *H04W 12/06* (2009.01)
  *H04W 84/04* (2009.01)

(52) U.S. Cl.
  CPC .......... *H04W 12/06* (2013.01); *H04W 84/042* (2013.01)

(58) Field of Classification Search
  CPC ... H04W 84/18; H04W 80/04; H04W 40/248; H04W 40/02; H04W 40/246;
  (Continued)

(56) References Cited

U.S. PATENT DOCUMENTS 1,872,857 A    4/1931    Wesson et al.
5,878,347 A    3/1999    Joensuu et al.
(Continued)

FOREIGN PATENT DOCUMENTS

CN    1809072 A    7/2006
CN    101001440 A    7/2007
(Continued)

OTHER PUBLICATIONS

Applicant Initiated Interview Summary for U.S. Appl. No. 14/826,289 (dated Jul. 27, 2017).
(Continued)

*Primary Examiner* — Nimesh Patel
(74) *Attorney, Agent, or Firm* — Jenkins, Wilson, Taylor & Hunt, P.A.

(57) ABSTRACT

A method for access network signaling protocol interworking for user authentication includes receiving, from a node in an access network, a message formatted according to a signaling protocol of the access network and containing an authentication payload formatted according to an authentication protocol. The method further includes, in response to receiving the message, formulating a message formatted according to a signaling protocol of a cellular network, the message including the authentication payload formatted according to the authentication protocol. The method further includes forwarding the message formatted according to the signaling protocol of the cellular network to a node in the cellular network that implements the authentication protocol, the message including the authentication payload formatted according to the authentication protocol.

13 Claims, 7 Drawing Sheets

(58) Field of Classification Search
CPC ... H04W 40/26; H04W 40/36; H04W 84/005; H04W 88/04; H04W 92/02; H04W 12/06; H04W 40/22; H04W 74/00; H04W 8/04; H04W 12/04; H04W 12/00; H04W 4/00; H04W 8/082; H04L 63/0892; H04L 43/0805; H04L 45/028; H04L 45/304; H04L 45/34; H04L 45/60; H04L 69/08; H04L 12/1407; H04L 63/0227; H04L 63/0263; H04L 43/0876; H04L 12/00
See application file for complete search history.

(56) References Cited

U.S. PATENT DOCUMENTS

| | | | |
|---|---|---|---|
| 6,006,098 | A | 12/1999 | Rathnasabapathy et al. |
| 6,298,383 | B1 | 10/2001 | Gutman et al. |
| 6,836,477 | B1 | 12/2004 | West, Jr. et al. |
| 6,967,956 | B1 | 11/2005 | Tinsley et al. |
| 7,292,592 | B2 | 11/2007 | Rune |
| 7,310,307 | B1 | 12/2007 | Das et al. |
| 7,319,857 | B2 | 1/2008 | Baldwin et al. |
| 7,551,926 | B2 | 6/2009 | Rune |
| 7,738,488 | B2 | 6/2010 | Marsico et al. |
| 7,792,981 | B2 | 9/2010 | Taylor |
| 7,814,015 | B2 | 10/2010 | Benedyk et al. |
| 7,844,745 | B1 | 11/2010 | Darbyshire et al. |
| 7,916,685 | B2 | 3/2011 | Schaedler et al. |
| 7,996,541 | B2 | 8/2011 | Marathe et al. |
| 8,015,293 | B2 | 9/2011 | Schaedler et al. |
| 8,532,110 | B2 | 9/2013 | McCann et al. |
| 8,547,908 | B2 | 10/2013 | Marsico |
| 8,615,237 | B2 | 12/2013 | Baniel et al. |
| 8,737,304 | B2 | 5/2014 | Karuturi et al. |
| 8,825,060 | B2 | 9/2014 | McCann et al. |
| 8,831,076 | B2 | 9/2014 | Yen |
| 8,918,469 | B2 | 12/2014 | Sprague et al. |
| 8,942,747 | B2 | 1/2015 | Marsico |
| 9,059,948 | B2 | 6/2015 | Schaedler et al. |
| 9,148,524 | B2 | 9/2015 | Deo |
| 9,288,169 | B2 | 3/2016 | Schaedler et al. |
| 9,319,378 | B2 | 4/2016 | McCann |
| 9,668,134 | B2 * | 5/2017 | McCann ............... H04W 12/06 |
| 9,668,135 | B2 * | 5/2017 | McCann ............... H04W 12/06 |
| 2001/0028636 | A1 | 10/2001 | Skog et al. |
| 2002/0147845 | A1 | 10/2002 | Sanchez-Herrero |
| 2002/0194378 | A1 | 12/2002 | Foti |
| 2002/0196775 | A1 | 12/2002 | Tuohino et al. |
| 2003/0040280 | A1 | 2/2003 | Koskelainen |
| 2003/0131151 | A1 | 7/2003 | Roach et al. |
| 2004/0098612 | A1 | 5/2004 | Lee et al. |
| 2004/0103157 | A1 | 5/2004 | Requena et al. |
| 2004/0152469 | A1 | 8/2004 | Yla-Outinen et al. |
| 2004/0205212 | A1 | 10/2004 | Huotari et al. |
| 2004/0223489 | A1 | 11/2004 | Rotsten et al. |
| 2004/0225878 | A1 | 11/2004 | Costa-Requena et al. |
| 2004/0242227 | A1 | 12/2004 | Huotari et al. |
| 2004/0246965 | A1 | 12/2004 | Westman et al. |
| 2004/0260816 | A1 | 12/2004 | Skog et al. |
| 2005/0007984 | A1 | 1/2005 | Shaheen et al. |
| 2005/0009520 | A1 | 1/2005 | Herrero et al. |
| 2005/0058125 | A1 | 3/2005 | Mutikainen et al. |
| 2005/0078642 | A1 | 4/2005 | Mayer et al. |
| 2005/0094594 | A1 | 5/2005 | Roh |
| 2005/0120198 | A1 | 6/2005 | Bajko et al. |
| 2005/0124341 | A1 | 6/2005 | Myllymaki et al. |
| 2005/0136926 | A1 | 6/2005 | Tammi et al. |
| 2005/0155036 | A1 | 7/2005 | Tiainen et al. |
| 2005/0159156 | A1 | 7/2005 | Bajko et al. |
| 2005/0227675 | A1 | 10/2005 | Lim et al. |
| 2005/0235000 | A1 | 10/2005 | Keil |
| 2006/0002308 | A1 | 1/2006 | Na et al. |
| 2006/0030320 | A1 | 2/2006 | Tammi et al. |
| 2006/0045249 | A1 | 3/2006 | Li et al. |
| 2006/0068762 | A1 | 3/2006 | Baldwin et al. |
| 2006/0068816 | A1 | 3/2006 | Pelaez et al. |
| 2006/0077926 | A1 | 4/2006 | Rune |
| 2006/0078119 | A1 | 4/2006 | Jee et al. |
| 2006/0136557 | A1 | 6/2006 | Schaedler et al. |
| 2006/0161512 | A1 | 7/2006 | Schaedler et al. |
| 2006/0172730 | A1 | 8/2006 | Matsuda |
| 2006/0221972 | A1 | 10/2006 | Bhargava et al. |
| 2006/0259759 | A1 | 11/2006 | Maino et al. |
| 2006/0274744 | A1 | 12/2006 | Nagai et al. |
| 2007/0121596 | A1 | 5/2007 | Kurapati et al. |
| 2007/0136590 | A1 | 6/2007 | Nah et al. |
| 2007/0153995 | A1 | 7/2007 | Fang et al. |
| 2007/0189215 | A1 | 8/2007 | Wu et al. |
| 2007/0242637 | A1 | 10/2007 | Dynarski et al. |
| 2007/0297419 | A1 | 12/2007 | Askerup et al. |
| 2008/0039104 | A1 | 2/2008 | Gu et al. |
| 2008/0256251 | A1 | 10/2008 | Huotari et al. |
| 2009/0080440 | A1 | 3/2009 | Balyan et al. |
| 2009/0089435 | A1 | 4/2009 | Terrill et al. |
| 2009/0129271 | A1 | 5/2009 | Ramankutty et al. |
| 2009/0156213 | A1 | 7/2009 | Spinelli et al. |
| 2009/0177796 | A1 | 7/2009 | Falk et al. |
| 2009/0196231 | A1 | 8/2009 | Giaretta et al. |
| 2009/0196290 | A1 | 8/2009 | Zhao et al. |
| 2009/0221310 | A1 | 9/2009 | Chen et al. |
| 2009/0232011 | A1 | 9/2009 | Li et al. |
| 2009/0264097 | A1 | 10/2009 | Cai et al. |
| 2009/0265467 | A1 | 10/2009 | Peles |
| 2009/0305684 | A1 | 12/2009 | Jones et al. |
| 2009/0313379 | A1 | 12/2009 | Rydnell et al. |
| 2010/0268814 | A1 | 10/2010 | Cross et al. |
| 2010/0290392 | A1 | 11/2010 | Rasanen et al. |
| 2010/0291923 | A1 | 11/2010 | Zhou et al. |
| 2010/0299451 | A1 | 11/2010 | Yigang et al. |
| 2010/0311392 | A1 | 12/2010 | Stenfelt et al. |
| 2010/0331023 | A1 | 12/2010 | Cai et al. |
| 2011/0040845 | A1 | 2/2011 | Cai et al. |
| 2011/0116378 | A1 | 5/2011 | Ramankutty et al. |
| 2011/0116382 | A1 | 5/2011 | McCann et al. |
| 2011/0158090 | A1 * | 6/2011 | Riley ..................... H04L 12/14 370/230 |
| 2011/0165901 | A1 | 7/2011 | Baniel et al. |
| 2011/0199906 | A1 | 8/2011 | Kanode et al. |
| 2011/0200053 | A1 | 8/2011 | Kanode et al. |
| 2011/0202612 | A1 | 8/2011 | Craig et al. |
| 2011/0202614 | A1 | 8/2011 | Craig et al. |
| 2011/0202676 | A1 | 8/2011 | Craig et al. |
| 2011/0211574 | A1 | 9/2011 | Li et al. |
| 2011/0225113 | A1 | 9/2011 | Mann |
| 2011/0225280 | A1 | 9/2011 | Delsesto et al. |
| 2011/0225281 | A1 | 9/2011 | Riley et al. |
| 2011/0225306 | A1 | 9/2011 | Delsesto et al. |
| 2011/0282904 | A1 | 11/2011 | Schaedler et al. |
| 2011/0302244 | A1 | 12/2011 | McCann et al. |
| 2011/0314178 | A1 * | 12/2011 | Kanode ............... H04L 63/0892 709/238 |
| 2012/0089993 | A1 | 4/2012 | Alarcon et al. |
| 2012/0096177 | A1 | 4/2012 | Rasanen |
| 2012/0124220 | A1 | 5/2012 | Zhou et al. |
| 2012/0129488 | A1 | 5/2012 | Patterson et al. |
| 2012/0155389 | A1 | 6/2012 | McNamee et al. |
| 2012/0155470 | A1 | 6/2012 | McNamee et al. |
| 2012/0177028 | A1 * | 7/2012 | Mo ..................... H04L 12/1407 370/351 |
| 2012/0201203 | A1 | 8/2012 | Miyagawa et al. |
| 2012/0202550 | A1 | 8/2012 | Marsico |
| 2012/0207015 | A1 * | 8/2012 | Marsico ............... H04L 41/0663 370/221 |
| 2012/0224524 | A1 | 9/2012 | Marsico |
| 2012/0224531 | A1 | 9/2012 | Karuturi et al. |
| 2012/0225679 | A1 | 9/2012 | McCann et al. |
| 2012/0226758 | A1 * | 9/2012 | Sprague ............... H04L 63/0892 709/206 |
| 2012/0226814 | A1 | 9/2012 | Stucker |
| 2012/0236871 | A1 | 9/2012 | Wallace et al. |
| 2012/0239771 | A1 | 9/2012 | Rasanen |
| 2012/0311064 | A1 | 12/2012 | Deo |
| 2013/0171990 | A1 * | 7/2013 | McCann ............... H04L 63/0263 455/435.1 |
| 2013/0246639 | A1 | 9/2013 | Nedbal et al. |

(56) References Cited

U.S. PATENT DOCUMENTS

| | | | |
|---|---|---|---|
| 2013/0279497 A1 | 10/2013 | Verma et al. | |
| 2013/0304843 A1 | 11/2013 | Chow et al. | |
| 2014/0207941 A1* | 7/2014 | McCann | H04L 61/2076 709/224 |
| 2014/0258423 A1 | 9/2014 | Schaedler et al. | |
| 2014/0321278 A1 | 10/2014 | Cafarelli et al. | |
| 2014/0342690 A1 | 11/2014 | Tanouchev et al. | |
| 2014/0355523 A1 | 12/2014 | Congdon et al. | |
| 2015/0036486 A1 | 2/2015 | McMurry et al. | |
| 2015/0149656 A1 | 5/2015 | McMurry et al. | |
| 2016/0373348 A1 | 12/2016 | Renzullo et al. | |
| 2017/0048190 A1 | 2/2017 | McCann | |
| 2017/0048202 A1 | 2/2017 | McCann | |
| 2017/0048703 A1 | 2/2017 | McCann | |
| 2017/0048704 A1 | 2/2017 | McCann | |
| 2017/0126522 A1 | 5/2017 | McCann et al. | |
| 2017/0238179 A1 | 8/2017 | McCann | |

FOREIGN PATENT DOCUMENTS

| | | |
|---|---|---|
| CN | 101079742 A | 11/2007 |
| CN | 101247321 A | 8/2008 |
| CN | 101277541 A | 10/2008 |
| CN | 101483826 A | 7/2009 |
| CN | 101867873 A | 10/2010 |
| CN | 101945047 A | 1/2011 |
| CN | 102239481 A | 11/2011 |
| CN | 201080065174.6 | 6/2015 |
| CN | 100037 | 7/2016 |
| CN | 103477661 B | 10/2016 |
| CN | 201280019607.3 | 12/2016 |
| CN | 201280013938.6 | 3/2017 |
| CN | 201280018298.8 | 3/2017 |
| CN | 201280018288.4 | 4/2017 |
| EP | 1 357 720 A1 | 10/2003 |
| EP | 1 630 999 A1 | 3/2006 |
| EP | 2 107 725 A1 | 10/2009 |
| EP | 2 234 422 A1 | 9/2010 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| EP | 2 522 103 A2 | 11/2012 |
| EP | 2 577 930 A2 | 4/2013 |
| EP | 2 681 940 B1 | 5/2016 |
| EP | 2 681 939 B1 | 9/2016 |
| EP | 2 522 102 B1 | 11/2016 |
| EP | 2 681 938 B2 | 12/2016 |
| JP | H10-98470 A | 4/1998 |
| JP | H11-224219 A | 8/1999 |
| JP | 2004-242326 A | 8/2004 |
| JP | 2006-513631 | 4/2006 |
| JP | 4041038 B2 | 1/2008 |
| JP | 2009-537102 | 10/2009 |
| JP | 2010-527520 | 8/2010 |
| JP | 2010-0278884 A | 12/2010 |
| JP | 2013-527999 T | 7/2013 |
| JP | 5732550 B2 | 6/2015 |
| JP | 5758508 B2 | 8/2015 |
| JP | 5759064 B2 | 8/2015 |
| JP | 5938052 B2 | 6/2016 |
| JP | 5950943 B2 | 7/2016 |
| JP | 6091657 B2 | 2/2017 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2009/086759 A1 | 7/2009 |
| WO | WO 2010/139360 A1 | 12/2010 |
| WO | WO 2011/082035 A2 | 7/2011 |
| WO | WO 2011/082090 A2 | 7/2011 |
| WO | WO 2011/082895 A1 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

Non-Final Office Action for U.S. Appl. No. 14/928,660 (dated Jul. 21, 2017).

Non-Final Office Action for U.S. Appl. No. 15/582,591 (dated Jun. 30, 2017).

Final Office Action for U.S. Appl. No. 14/742,679 (dated Jun. 30, 2017).

Non-Final Office Action for U.S. Appl. No. 14/826,289 (dated May 1, 2017).

Commonly-assigned, co-pending U.S. Appl. No. 15/582,591 for "Methods, Systems, and Computer Readable Media for Providing Access Network Protocol Interworking and Authentication Proxying," (Unpublished, filed Apr. 28, 2017).

Communication pursuant to Article 94(3) EPC for European Application No. 12 751 783.7 (dated Mar. 15, 2017).

Notice of Allowance and Fee(s) Due for U.S. Appl. No. 14/827,015 (dated Mar. 10, 2017).

Letter Regarding Decision to Grant for Chinese Application No. ZL201280018288.4 (dated Feb. 14, 2017).

Letter Regarding Decision to Grant for Chinese Application No. ZL201280013938.6 (dated Feb. 3, 2017).

Non-Final Office Action for U.S. Appl. No. 14/742,679 (dated Feb. 2, 2017).

Letter Regarding Notice of Grant for Japanese Patent Application No. 2015-553784 (dated Jan. 24, 2017).

Notice of Allowance and Fee(s) Due for U.S. Appl. No. 14/827,025 (dated Jan. 20, 2017).

Letter Regarding Decision to Grant for Chinese Patent Application No. ZL201280018298.8 (dated Jan. 10, 2017).

Extended European Search Report for European Patent Application No. 12741984.4 (dated Dec. 20, 2016).

Applicant-Initiated Interview Summary for U.S. Appl. No. 14/827,025 (dated Dec. 13, 2016).

Decision to grant a European patent pursuant to Article 97(1) EPC for European Patent Application No. 12751812.4 (dated Nov. 24, 2016).

Non-Final Office Action for U.S. Appl. No. 14/827,015 (dated Oct. 31, 2016).

Decision to grant a European patent pursuant to Article 97(1) EPC for European Patent Application No. 10841605.8 (dated Oct. 27, 2016).

Letter Regarding Decision to Grant a Chinese Patent for Chinese Patent Appication No. ZL201280019607.3 (dated Oct. 10, 2016).

Notification of the Second Office Action for Chinese Patent Application No. 201280013938.6 (dated Oct. 9, 2016).

Notification of the Second Office Action for Chinese Patent Application No. 201280018288.4 (dated Sep. 5, 2016).

Communication under Rule 71(3) EPC for European Patent Application No. 12 751 812.4 (dated Sep. 2, 2016).

Non-Final Office Action for U.S. Appl. No. 14/827,025 (dated Aug. 26, 2016).

Decision to grant a European patent pursuant to Article 97(1) EPC for European Patent Applicaton.No. 12751986.6 (dated Aug. 19, 2016).

Intent to Grant for European Patent Application No. 10841605.8 (dated Aug. 12, 2016).

Letter Regarding Office Action for Japanese Patent Application No. 2015-553784 (dated Jul. 19, 2016).

Letter Regarding Notice of Grant for Chinese Patent Application No. ZL201280018297.3 (dated Jul. 4, 2016).

Communication under Rule 71(3) EPC for European Application No. 12 751 986.6 (dated Jun. 8, 2016).

Letter Regarding Notice of grant for Japanese Patent Application No. 2013-552714 (dated May 31, 2016).

(56) References Cited

OTHER PUBLICATIONS

Decision to grant a European patent pursuant to Article 97(1) EPC for European Application No.12752952.7 (dated Apr. 29, 2016).
Official Notice of Grant for Japanese Patent Application No. 2013-556860 (dated Apr. 26, 2016).
Notification of the First Office Action for Chinese Patent Application No. 201280018298.8 (dated Mar. 3, 2016).
Communication pursuant to Article 94(3) EPC for European Patent Application No. 10841605.8 (dated Feb. 22, 2016).
Communication under Rule 71(3) EPC for European Patent Application No. 12752952.7 (dated Feb. 10, 2016).
Letter Regarding Notice of Grant for Japanese Patent Application No. 2013-556855 (dated Feb. 2, 2016).
Notification of the First Office Action for Chinese Application No. 201280019607.3 (dated Feb. 1, 2016).
Notification of the First Office Action for Chinese Application No. 201280013938.6 (dated Jan. 27, 2016).
Notification of the First Office Action for Chinese Application No. 201280018297.3 (dated Jan. 15, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Notice of Allowance and Fee(s) Due for U.S. Appl. No. 13/748,547 (dated Dec. 11, 2015).
Letter Regarding Office Action for Japanese Patent Application No. 2013-552714 (dated Dec. 8, 2015).
Letter Regarding Final Rejection for Japanese Patent Application No. 2013-556860 (dated Nov. 17, 2015).
Communication of European publication number and information on the application of Article 67(3) EPC for European Application No. 14702996.1 (dated Nov. 4, 2015).
Commonly-assigned, co-pending U.S. Appl. No. 14/929,283 for "Methods, Systems, and Computer Readable Media for Remote Access Dial in User Service (RADIUS) Proxy and Diameter Agent Address Resolution," (Unpublished, filed Oct. 31, 2015).
Commonly-assigned, co-pending U.S. Appl. No. 14/928,660 for "Methods, Systems, and Computer Readable Media for Remote Authentication Dial in User Service (RADIUS) Message Loop Detection and Mitigation," (Unpublished, filed Oct. 30, 2015).
Notice of Allowance and Fee(s) Due and Applicant-Initiated Interview Summary for U.S. Appl. No. 14/190,071 (dated Oct. 30, 2015).
Advisory Action for U.S. Appl. No. 13/748,547 (dated Oct. 16, 2015).
Supplemental Notice of Allowability & Response to Rule 312 Communication for U.S. Appl. No. 13/465,552 (dated Aug. 27, 2015).
Commonly-assigned, co-pending U.S. Appl. No. 14/826,289 for "Methods, Systems, and Computer Readable Media for Providing Access Network Session Correlation for Policy Control," (Unpublished, filed Aug. 14, 2015).
Commonly-assigned, co-pending U.S. Appl. No. 14/827,015 for "Methods, Systems, and Computer Readable Media for Providing Access Network Protocol Interworking and Authentication Proxying," (Unpublished, filed Aug. 14, 2015).
Commonly-assigned, co-pending U.S. Appl. No. 14/827,025 for "Methods, Systems, and Computer Readable Media for Providing Access Network Signaling Protocol Interworking for User Authentication," (Unpublished, filed Aug. 14, 2015).
Final Office Action for U.S. Appl. No. 13/748,547 (dated Aug. 10, 2015).
Letter Regarding Publication of Patent for Japanese Patent Application No. 2014-509509 (dated Aug. 5, 2015).
Letter Regarding Publication of Patent for Japanese Patent Application No. 2013-556857 (dated Aug. 5, 2015).
Letter Regarding Office Action for Japanese Patent Application No. 2013-556860 (dated Jul. 21, 2015).
Non-Final Office Action for U.S. Appl. No. 14/190,071 (dated Jul. 8, 2015).
Letter Regarding Publication of Patent for Japanese Patent Application No. 2013-556675 (dated Jun. 10, 2015).
Letter Regarding Notice of Grant for Japanese Patent Application No. 2014-509509 (dated Jun. 2, 2015).
Letter Regarding Notice of Grant for Japanese Patent Application No. 2013-556857 (dated May 26, 2015).
Notice of Allowance and Fee(s) Due and Examiner-Initiated Interview Summary for U.S. Appl. No. 13/465,552 (dated May 20, 2015).
Decision to Grant for Chinese Patent Application No. 201080065174.6 (dated Apr. 16, 2015).
Second Office Action for Japanese Patent Application No. 2013-556857 (dated Apr. 14, 2015).
Letter Regarding Notice of Grant for Japanese Patent Application No. 2013-556675 (dated Mar. 31, 2015).
Letter Regarding Office Action for Japanese Patent Application No. 2013-556855 (dated Feb. 24, 2015).
Notice of Allowance and Fee(s) Due and Examiner-Initiated Interview Summary for U.S. Appl. No. 13/192,410 (dated Feb. 12, 2015).
Applicant-Initiated Interview Summary for U.S. Appl. No. 13/465,552 (dated Feb. 9, 2015).
Notice of Panel Decision from Pre-Appeal Brief Review for U.S. Appl. No.13/192,410 (dated Feb. 4, 2015).
Extended European Search Report for European Patent Application No. 12751986.6 (dated Jan. 20, 2015).
Non-Final Office Action for U.S. Appl. No. 13/748,547 (dated Jan. 5, 2015).
Supplemental Notice of Allowability for U.S. Appl. No. 13/366,928 (dated Dec. 26, 2014).
Non-Final Office Action for U.S. Appl. No. 13/465,552 (dated Oct. 17, 2014).
Letter Regarding Office Action for Japanese Patent Application No. 2013-556675 (dated Sep. 30, 2014).
Final Office Action for U.S. Appl. No. 13/192,410 (dated Sep. 25, 2014).
First Office Action for Japanese Application No. 2013-556857 (dated Sep. 24, 2014).
Notice of Allowance and Fee(s) Due for U.S. Appl. No. 13/366,928 (dated Sep. 3, 2014).
Extended European Search Report for European Application No. 12752952.7 (dated Aug. 27, 2014).
Notification of the First Office Action for Chinese Application No. 201080065174.6 (dated Aug. 13, 2014).
Extended European Search Report for European Application No. 12751783.7 (dated Jul. 22, 2014).
Extended European Search Report for European Application No. 12751812.4 (dated Jul. 16, 2014).
Notice of Allowance and Fee(s) Due for U.S. Appl. No. 13/409,893 (dated Jul. 10, 2014).
Notice of Allowance and Fee(s) Due for U.S. Appl. No. 13/409,914 (dated Apr. 25, 2014).
Supplemental Notice of Allowability for U.S. Appl. No. 13/409,949 (dated Apr. 24, 2014).
Notification of Transmittal of the International Search Report and the Written Opinion of the International Searching Authority, or the Declaration for International Patent Application No. PCT/US2014/011548 (dated Mar. 28, 2014).
Non-Final Office Action for U.S. Appl. No. 13/366,928 (dated Mar. 21, 2014).
Non-Final Office Action for U.S. Appl. No. 13/192,410 (dated Feb. 20, 2014).
Communication of European publication number and information on the application of Article 67(3) EPC for European Application No. 12781800.3 (dated Feb. 12, 2014).
Advisory Action Before the Filing of an Appeal Brief for U.S. Appl. No. 13/366,928 (dated Feb. 10, 2014).
Extended European Search Report for European Application No. 10841605.8 (dated Feb. 3, 2014).
Notice of Allowance and Fee(s) Due for U.S. Appl. No. 13/409,949 (dated Jan. 14, 2014).
Final Office Action for U.S. Appl. No. 13/409,914 (dated Dec. 30, 2013).

(56) References Cited

OTHER PUBLICATIONS

Notification of Publication and Entry into Examination Procedure for Chinese Patent Application No. 201280013938.6 (dated Dec. 18, 2013).
Communication of European publication number and information on the application of Article 67(3) EPC for European Application No. 12751986.6 (dated Dec. 11, 2013).
Communication of European publication number and information on the application of Article 67(3) EPC for European Application No. 12751783.7 (dated Dec. 11, 2013).
Communication of European publication number and information on the application of Article 67(3) EPC for European Application No. 12751812.4 (dated Dec. 11, 2013).
Communication of European publication number and information on the application of Article 67(3) EPC for European Application No. 12741984.4 (dated Nov. 13, 2013).
Declaration of Mark Kanode for U.S. Appl. No. 13/409,893 (dated Nov. 1, 2013).
Advisory Action for U.S. Appl. No. 13/192,410 (dated Oct. 24, 2013).
Final Office Action for U.S. Appl. No. 13/366,928 (dated Oct. 23, 2013).
Applicant-Initiated Interview Summary for U.S. Appl. No. 13/192,410 (dated Oct.18, 2013).
Final Office Action for U.S. Appl. No. 13/409,949 (dated Sep. 19, 2013).
Advisory Action Before the Filing of an Appeal Brief for U.S. Appl. No. 13/409,893 (dated Sep. 13, 2013).
Notice of Allowance and Fee(s) Due for U.S. Appl. No. 12/974,869 (dated Aug. 19, 2013).
Final Office Action for U.S. Appl. No. 13/192,410 (dated Aug. 5, 2013).
Final Office Action for U.S. Appl. No. 13/409,893 (dated Jul. 1, 2013).
Non-Final Office Action for U.S. Appl. No. 13/409,914 (dated Jun. 7, 2013).
Notice of Allowance and Fee(s) Due for U.S. Appl. No. 13/412,352 (dated May 28, 2013).
Non-Final Office Action for U.S. Appl. No. 13/366,928 (dated Mar. 26, 2013).
Non-Final Office Action for U.S. Appl. No. 13/409,949 (dated Feb. 15, 2013).
Notice of Allowance and Fee(s) Due for U.S. Appl. No. 13/366,928 (dated Jan. 7, 2013).
Non-Final Office Action for U.S. Appl. No. 13/192,410 (dated Dec. 20, 2012).
Non-Final Office Action for U.S. Appl. No. 13/409,893 (dated Dec. 13, 2012).
Non-Final Official Action for U.S. Appl. No. 12/409,914 (dated Nov. 6, 2012).
Notification of Transmittal of the International Search Report and the Written Opinion of the International Searching Authority, or the Declaration for International Patent Application No. PCT/US2012/036784 (dated Nov. 1, 2012).
Non-Final Official Action for U.S. Appl. No. 13/412,352 (dated Oct. 26, 2012).
Communication of European publication number and information on the application of Article 67(3) EPC for European Patent Application No. 10841605.8 (dated Oct. 17, 2012).
Fajardo et al., "Diameter Base Protocol," RFC 6733, pp. 1-152 (Oct. 2012).
Notification of Transmittal of the International Search Report and the Written Opinion of the International Searching Authority, or the Declaration for International Patent Application No. PCT/US2012/027281 (dated Jun. 15, 2012).
Notification of Transmittal of the International Search Report and the Written Opinion of the International Searching Authority, or the Declaration for International Patent Application No. PCT/US2012/027263 (dated Jun. 14, 2012).
Notification of Transmittal of the International Search Report and the Written Opinion of the International Searching Authority, or the Declaration for International Patent Application No. PCT/US2012/027736 (dated Jun. 12, 2012).
Notification of Transmittal of the International Search Report and the Written Opinion of the International Searching Authority, or the Declaration for International Patent Application No. PCT/US2012/023971 (dated Jun. 11, 2012).
Notification of Transmittal of the International Search Report and the Written Opinion of the International Searching Authority, or the Declaration for International Patent Application No. PCT/US2012/027269 (dated Jun. 11, 2012).
"Multi-Protocol Routing Agent User's Guide," 910-6404-001 Revision A, Policy Management, Tekelec, pp. 1-70 (Jun. 2012).
Decision to grant a European patent pursuant to Article 97(1) EPC for European Application No. 05854512.0 (dated Mar. 15, 2012).
Communication under Rule 71(3) EPC for European application No. 05854512.0 (dated Nov. 11, 2011).
Notification of Transmittal of the International Search Report and the Written Opinion of the International Searching Authority, or the Declaration for International Patent Application No. PCT/US2010/061934 (dated Oct. 25, 2011).
Notice of Allowance and Fee(s) Due for U.S. Appl. No. 11/303,757 (dated May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP,"3rd Generation Partnership Project; Technical Specification Group Services and System Aspects; Policy and Charging Control Architecture (Release 11)," 3GPP TS 23.203 V11.0.1, pp. 1-137 (Jan. 2011).
"Traffix Signaling Delivery Controller—One Platform to Deliver the Wonders of 4G," Traffix Systems, The Diameter Control Plane Experts, pp. 1-7 (2011).
"Traffix Signaling Delivery Controller (SDC)," Traffix Systems, The Diameter Control Plane Experts, pp. 1-5 (2011).
"Traffix Signaling Delivery Controller (SDC) Diameter Gateway—Use Case Development Scenarios," Traffix Systems, The Diameter Control Plane Experts, www.traffixsystems.com pp. 1-4 (2011).
"Traffix Signaling Delivery Controller Diameter Load Balancer: Scalability for your Control Plane," Traffix Systems, The Diameter Control Plane Experts, www.traffixsystems.com, pp. 1-3 (2011).
Official Action for U.S. Appl. No. 11/303,757 (dated Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0, pp. 1-20 (Dec. 2010).
Communication pursuant to Article 94(3) EPC for European Application No. 05 854 512.0 (dated Oct. 12, 2010).
"Digital cellular tellecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0, pp. 1-130 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0, pp. 1-40 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0, pp. 1-76 (Oct. 2010).
"3rd Generation Partnership Project; Technical Specification Group Services and System Aspects; Telecommunication management; Charging management; Diameter charging applications (Release 9)," 3GPP TS 32.299, V9.4.0, pp. 1-148 (Jun. 2010).
"3rd Generation Partnership Project; Technical Specification Group Services and System Aspects; Telecommunication management; Charging management; Charging architecture and principles (Release 9)," 3GPP TS 32.240, V9.1.0, pp. 1-44 (Jun. 2010).

(56) References Cited

OTHER PUBLICATIONS

Znaty, "DIAMETER, GPRS, (LTE + ePC = EPS), IMS, PCC and SDM," EFORT, pp. 1-229 (Part 1 of 2) (May 2010).
Znaty, "Diameter, GPRS, (LTE + ePC = EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0, pp. 1-11 (Mar. 2010).
Communication pursuant to Article 94(3) EPC for European Application No. 05854512.0 (dated Feb. 8, 2010).
Final Official Action for U.S. Appl. No. 11/303,757 (dated Dec. 9, 2009).
"3rd Generation Partnership Project; Technical Specification Group Services and System Aspects; Policy and charging control architecture (Release 9)," 3GPP TS 23.203, V9.3.0, pp. 1-123 (Dec. 2009).
Supplementary European Search Report for European Application No. 05854512.0 (dated Nov. 17, 2009).
Official Action for U.S. Appl. No. 11/303,757 (dated May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
Gundavelli et al., "Network Mobility (NEMO) Management Information Base," RFC 5488, pp. 1-44 (Apr. 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (dated Oct. 6, 2008).
Official Action for U.S. Appl. No. 11/303,757 (dated May 7, 2008).
Notification of Transmittal of the International Search Report and the Written Opinion corresponding to International Application No. PCT/US05/45813 (dated Mar. 24, 2008).
Official Action for U.S. Appl. No. 11/303,757 (dated Feb. 21, 2008).
Chiba et al., "Dynamic Authorization Extensions to Remote Authentication Dial in User Service (RADIUS)," RFC 5176, pp. 1-32 (Jan. 2008).
Restriction Requirment for U.S. Appl. No. 11/303,757 (dated Oct. 4, 2007).
"Tekelec Announces TekCore IMS Core Platform," pp. 1-2 (Jun. 5, 2006).
"Operator Guidebook to IMS and New Generation Networks and Services," www.morianagroup.com, Second Edition, 480 pgs. (Feb. 2006).
Liu et al., "IBM Technical Library, Introduction to Diameter," pp. 1-9, http://www.ibm.com/developerworks/wireless/library/wi-diameter (Jan. 24, 2006).
Arkko et al., "Extensible Authentication Protocol Method for 3rd Generation Authentication and Key Agreement (EAP-AKA)," RFC 4187, pp. 1-79 (Jan. 2006).
Haverinen et al., "Extensible Authentication Protocol Method for Global System for Mobile Communications (GSM) Subscriber Identity Modules (EAP-SIM)," RFC 4186, pp. 1-80 (Jan. 2006).
Rouse, "Platform," http://searchservervirtualization.techtarget.com. definition/platform, pp. 1-2, (2006-2009).
Camarillo et al., "The 3G IP Multimedia Subsystem (IMS), Merging the Internet and the Cellular Worlds," Second Edition, pp. xvii-427 (2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture, Chapter 5: Session Control in the IMS, pp. 29-39, 91-105 (Aug. 20, 2004).
"IP Multimedia Subsystem IMS Over and Applications," 3G Americas, pp. 1-17 (Jul. 2004).
Aboba et al., "Extensible Authentication Protocol (EAP)," RFC 3748, pp. 1-67 (Jun. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.50013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
Calhoun et al., "Diameter Base Protocol," RFC 3588, pp. 1-147 (Sep. 2003).
Aboba et al., "RADIUS (Remote Authentication Dial in User Service) Support for Extensible Authentication Protocol (EAP)," RFC 3579, pp. 1-46 (Sep. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
"ITP Operations Manual," Cisco Systems, Inc. pp. 1-320 (May 1, 2002).
Howard, "Sipping IETF51 3GPP Security and Authentication," http://www3.ietf.org/proceedings/01aug/slides/sipping-7/index.htm, 24 pgs. (Dowloaded from Internet on Dec. 16, 2005) (Sep. 13, 2001).
Calhoun et al., "Diameter Base Protocol,"draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
"Configuring ITP Optional Features," IP Transfer Point, Cisco Systems, Inc., pp. 29-76 (2001).
"Cisco IP Transfer Point Q & A," Cisco Systems, Inc., pp. 1-15 (1992-2001).
Faltstrom, "E.164 Number and DNS," RFC 2916, pp. 1-10 (Sep. 2000).
Rigney et al., "RADIUS Accounting," RFC 2866, pp. 1-26 (Jun. 2000).
Rigney et al., "Remote Authentication Dial in User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).

(56) References Cited

OTHER PUBLICATIONS

Calhoun et al., "Diameter Proxy Server Extensions," IETF Working Draft, draft-calhoun-diameter-proxy-01.txt, pp. 1-21 (Aug. 1, 1998).

Berners-Lee et al., "Uniform Resource Identifiers (URI): Generic Syntax," RFC 2396, pp. 1-38 (Aug. 1998).

Tekelec, "Eagle® Feature Guide," P/N 910-1225-01, pp. 1-208 (Jan. 1998).

Jalava, "Service Routing in 3GPP IP Multimedia Subsystem," Nokia, pp. 1-16 (Publication Date Unknown).

Advisory Action Before the Filing of an Appeal Brief, Examiner-Initiated Interview Summary, and AFCP 2.0 Decision for U.S. Appl. No. 14/742,679 (dated Sep. 22, 2017).

Non-Final Office Action for U.S. Appl. No. 14/929,283 (dated Aug. 30, 2017).

\* cited by examiner

METHODS, SYSTEMS, AND COMPUTER READABLE MEDIA FOR PROVIDING ACCESS NETWORK SIGNALING PROTOCOL INTERWORKING FOR USER AUTHENTICATION

PRIORITY CLAIM

This application is a divisional of U.S. patent application Ser. No. 14/827,025, filed Aug. 14, 2015, the disclosure of which is incorporated herein by reference in its entirety.

TECHNICAL FIELD

The subject matter described herein relates to seamlessly authenticating users of non-3GPP access networks, either trusted or untrusted, using an authentication, authorization, and account (AAA) server, such as a 3GPP AAA server. More particularly, the subject matter described herein relates to methods, systems, and computer readable media for providing access network signaling protocol interworking for user authentication.

BACKGROUND

When a user seeks to connect to a non-3GPP access network, the user (e.g. a mobile device) may need to be authenticated with the 3GPP core network to access services, such as VoIP calling, that require core network elements. In one example, the access network may be a trusted or untrusted Wi-Fi network from the perspective of the core network, which may affect some of the parameters used for authentication.

One example of an authentication protocol that could be used to authenticate access network users to the core network is extensible authentication protocol (EAP). For example, EAP authentication can be used between the access network (e.g. a Wi-Fi access gateway (WAG)) and an AAA server in the core network if the signaling protocol used by the access and core networks to carry the authentication information is the same. However, access networks often use different signaling protocols, such as RADIUS, to carry authentication information than protocols, such as Diameter, used by AAA servers. In light of the different protocols and network nodes involved, there exists a need for seamlessly authenticating Wi-Fi and other non-3GPP access network users to cellular networks that use a different signaling protocol to carry authentication information.

SUMMARY

The subject matter described herein includes methods, systems, and computer readable media for access network protocol interworking for user authentication. A method for access network signaling protocol interworking for user authentication includes receiving, from a node in an access network, a message formatted according to a signaling protocol of the access network and containing an authentication payload formatted according to an authentication protocol. The method further includes, in response to receiving the message, formulating a message formatted according to a signaling protocol of a cellular network, the message including the authentication payload formatted according to the authentication protocol. The method further includes forwarding the message formatted according to the signaling protocol of the cellular network to a node in the cellular network that implements the authentication protocol, the message including the authentication payload formatted according to the authentication protocol.

The subject matter described herein for signaling protocol interworking for user authentication may perform the signaling protocol interworking when the authentication protocol is implemented by a physical SIM card, a software implemented SIM card, or other hardware, software module, or firmware module in a user device implements an authentication protocol. Thus, user authentication as described herein is intended to each of the aforementioned implementations.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

According to the subject matter described herein authentication may be performed automatically where the user is authenticated to both the access network and a cellular network that allows the user to access cellular network services while connected to a trusted or untrusted access network. For example, authentication may be initiated by the SIM of the user device according to the extensible authentication protocol (EAP). The base extensible authentication protocol is described in IETF RFC 3748, Extensible Authentication Protocol (EAP), June 2004. RADIUS support for EAP is described in IETF RFC 3579, RADIUS (Remote Dial In User Service) Support for Extensible Authentication Protocol (EAP), September 2003. EAP methods for third generation authentication are found in IETF RFC 4187, Extensible Authentication Protocol Method for $3^{rd}$ Generation Authentication and Key Agreement (EAP-AKA), January 2006 and IETF RFC 5488, Extensible Authentication Protocol Method for $3^{rd}$ Generation Authentication and Key Agreement (EAP-AKA'), May 2009. The use of EAP for SIM based authentication is described in IETF RFC 4186, Extensible Authentication Protocol Method for Global System for Mobile Communications (GSM) Subscriber Identity Modules (EAP-SIM), January 2006. The disclosure of each of these RFCs is incorporated herein by reference in its entirety.

EAP payloads must be communicated between the client in the access network, such as a Wi-Fi access gateway, and an AAA server to authenticate users who connect to an access network to the cellular network. The EAP SIM protocol RFC specifies RADIUS as the protocol for communicating EAP payloads between nodes in the access network. However, cellular networks may utilize Diameter for communicating with the AAA server. In other access networks, Diameter may be used for authentication, while the cellular network may use RADIUS for authentication. Because RADIUS and Diameter are different protocols, interworking is required to authenticate users who connect to an access network that uses one protocol to communicate authentication information with a cellular network that uses a different protocol to communicate authentication information.

Figure 1:
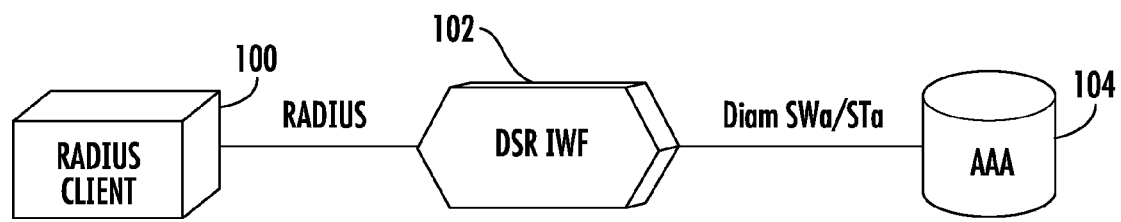
FIG. 1 is a network diagram illustrating a Diameter signaling router (DSR) including an interworking function (IWF) for access network signaling protocol interworking for user authentication according to an embodiment of the subject matter described herein.

FIG. 1 is a network diagram illustrating a DSR including an IWF for signaling protocol interworking for authentication between an access network that uses RADIUS and a cellular network that uses Diameter to communicate with an AAA server. Referring to FIG. 1, when a user device connects to an access network via a RADIUS client 100, RADIUS client 100 may communicate RADIUS messages carrying authentication payloads to DSR 102. In one example, RADIUS client 100 may be a Wi-Fi access gateway (WAG). DSR 102 may include an interworking function that converts between the RADIUS protocol and a Diameter protocol to communicate the authentication payloads to an AAA server 104. The Diameter protocol used on the interface between DSR 102 and AAA server 104 may be a Diameter SWa protocol or a Diameter STa protocol. The Diameter STa protocol is used when the access network is trusted. The Diameter SWa protocol is used when the access network is untrusted.

Figure 2:
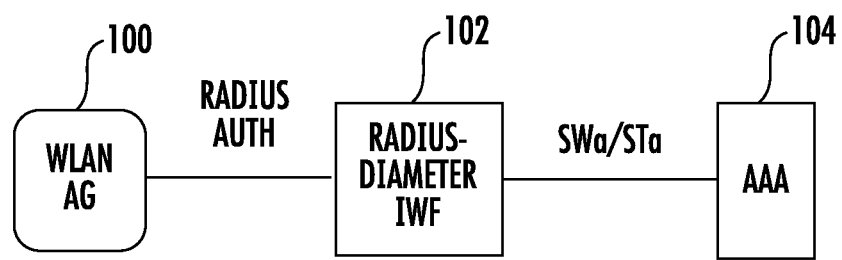
FIG. 2 is network diagram illustrating a DSR with a RADIUS-Diameter IWF for RADIUS-Diameter interworking according to an embodiment of the subject matter described herein.

FIG. 2 is a network diagram illustrating an example of RADIUS-Diameter interworking for authentication. In FIG. 2, DSR 102 includes a RADIUS-Diameter IWF 200 that performs the signaling protocol interworking between RADIUS authentication messages and Diameter SWa/STa authentication messages. In the illustrated example, client 100 is a WLAN access gateway (AG). Such a gateway may be used by a Wi-Fi access network as an authentication gateway for user devices that attach to the access network. Because client 100 uses RADIUS and AAA server 104 uses Diameter SWa or STa, The RADIUS-Diameter IWF of DSR 102 performs the interworking required for seamless authentication between the RADIUS and Diameter networks.

As stated above, Diameter SWa is the protocol used between an untrusted non-3GPP IP access network and a 3GPP AAA server or proxy. Diameter STa is used between a trusted non-3GPP IP access network or proxy and a 3GPP access network or proxy. SWa and STA share the same Diameter STa application ID. The decision as to whether the non-3GPP access is trusted or untrusted is made by the 3GPP AAA server during the access and authorization procedure and communicated to the non-3GPP access network.

Figure 3:
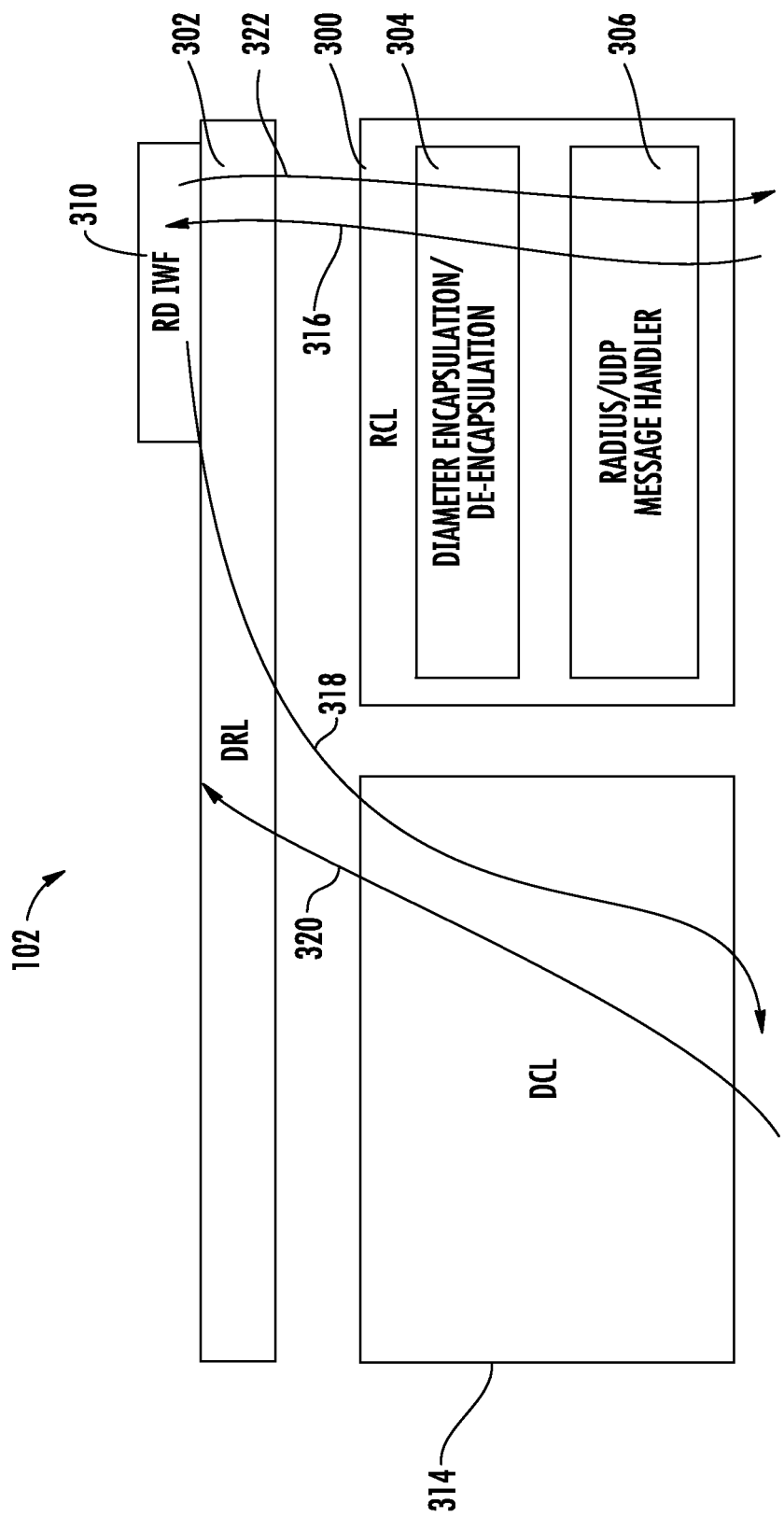
FIG. 3 is a block diagram illustrating exemplary components of a DSR for access network signaling protocol interworking for user authentication according to an embodiment of the subject matter described herein.

Because DSR 102 interfaces with both RADIUS and Diameter networks, DSR 102 includes internal components that perform the operations for Diameter-RADIUS protocol interworking. FIG. 3 is a block diagram illustrating exemplary components of DSR 102 that perform RADIUS to Diameter protocol interworking. Referring to FIG. 3, DSR 102 includes a RADIUS connection layer (RCL) 300 that encapsulates ingress RADIUS messages in Diameter messages for processing by internal Diameter components of DSR 102, such as Diameter routing layer (DRL) 302, which routes Diameter messages based on Diameter layer information in the messages. In an alternate implementation, RCL 300 may be omitted, and DSR 102 may also include a RADIUS routing layer that routes RADIUS messages based on RADIUS level information in the messages.

RCL 300 includes a Diameter encapsulation/de-encapsulation module 304 for performing the encapsulation and de-encapsulation of RADIUS messages. For example, Diameter encapsulation/de-encapsulation module 304 may encapsulate ingress RADIUS messages in Diameter messages as described above. Diameter encapsulation/de-encapsulation module 304 may remove egress RADIUS messages from their encapsulating Diameter messages before forwarding the RADIUS messages over a RADIUS network. RCL 300 may also include a RADIUS/UDP message handler 306 that removes ingress RADIUS messages from user datagram protocol (UDP) datagrams and encapsulates egress RADIUS messages in UDP datagrams.

A mediation function implemented in DRL 302 triggers a RADIUS to Diameter interworking for authentication (RD-IWF) function 310 for formulating RADIUS and Diameter request/response messages. If the ingress protocol is RADIUS and the egress protocol is Diameter, interworking function 310 may formulate the proper Diameter request/response message to carry the authentication payload obtained from the received RADIUS message to the Diameter network. If the ingress protocol is Diameter and the egress protocol is RADIUS, interworking function 310 may formulate the proper RADIUS message to carry the authentication payload obtained from the received Diameter message to the RADIUS network. Interworking function 310 may also generate error messages towards the RADIUS network. DRL 302 or DCL 310 may generate error messages towards the Diameter network.

In one exemplary implementation, interworking function 310 may be implemented using scripts such that modifications in mapping of parameters between the signaling protocol of the access network and that of the cellular network can be changed without code modification. If, for example, a new protocol parameter mapping needs to be added, the user can simply create a script that implements the new mapping and interworking function 310 will execute the script to perform the required mapping.

DRL 302 routes RADIUS-directed messages received from interworking function 310, and RCL 300 de-encapsulates the RADIUS-directed messages and sends the messages to RADIUS client 100. For Diameter-directed messages received from interworking function 310, DRL 302 routes the messages to AAA server 104. A Diameter connection layer (DCL) 314 maintains Diameter connections with external nodes, such as AAA server 104. In FIG. 3, arrow 316 illustrates the message flow path for inbound RADIUS messages, arrow 318 illustrates the message flow path for outbound Diameter messages, arrow 320 illustrates the message flow path for inbound Diameter messages, and arrow 322 illustrates the message flow path for outbound RADIUS messages. An exemplary hardware architecture for DSR 102 will be described in detail below.

Figure 4:
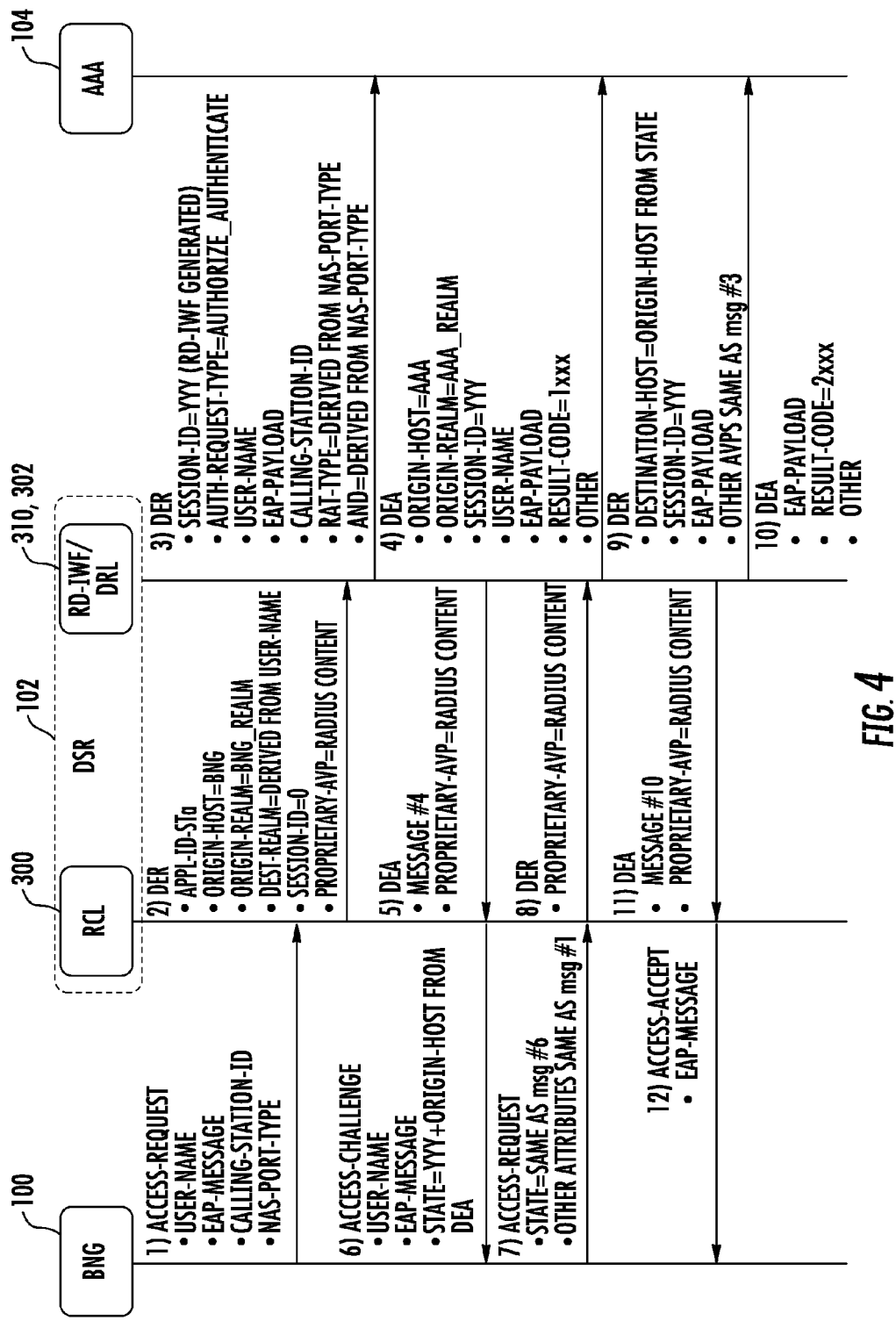
FIG. 4 is a message flow diagram illustrating exemplary message exchanges for RADIUS-Diameter interworking for user authentication according to an embodiment of the subject matter described herein.

One type of signaling protocol interworking that may be performed by DSR 102 is illustrated in FIG. 4. More particularly, FIG. 4 is a message flow diagram illustrating RADIUS-Diameter interworking when client 100 is a broadband network gateway (BNG). The messages in FIG. 4 may include AVPs or parameters in addition to those shown in FIG. 4. Referring to FIG. 4, when a user device attaches to an access network that supports automatic authentication as described herein, the user device sends authentication credentials from its SIM to BNG 100. The user device may be a mobile device, such as a mobile handset, a tablet computer, or a laptop computer. Alternatively, the user device may be a non-mobile computer, such as a desktop personal computer. In response to receiving the authentication credentials, BNG 100 sends a RADIUS access request message to DSR 102. The RADIUS access request message includes the user name of the user seeking authentication, an EAP message, a calling station ID, and a NAS port type. When DSR 102 receives the RADIUS access request message, RCL 300 encapsulates the RADIUS access request message in a Diameter EAP request (DER) message. The DER message includes the application ID STa, an origin host parameter that identifies the BNG as the origin host, an origin realm parameter that identifies the BNG realm as the origin realm, a destination realm parameter that is derived from the username and that corresponds to the realm of AAA server 104, a session ID parameter equal to zero, and a proprietary AVP that identifies the DER message as carrying RADIUS content.

In response to receiving the RADIUS access request message, DRL 302 triggers RD-IWF 310 to perform RADIUS-Diameter interworking. For the received RADIUS access request message, such interworking includes formulating a DER message and mapping parameters from the RADIUS message to the DER message. Accordingly, RD-IWF 110 formulates message 3, which is a DER message. The DER message includes a session ID parameter generated by RD-IWF 310, an authentication request type parameter specifying authorize_authenticate, the user name, the EAP payload, the calling station ID, a remote access type (RAT)-type derived from the NAS port type, and an access network (AN) ID derived from the NAS port type. Once RD-IWF 310 formulates the DER message, RD-IWF passes the message to DRL 302, which routes the DER message to AAA server 104.

Upon receiving the DER message, AAA server 104 performs a lookup in its subscriber database using user ID information extracted from the EAP payload. In this example, it is assumed that AAA server 104 locates a record for the subscriber and obtains EAP access challenge information from the record. Accordingly, AAA server 104 formulates message 4, which is a Diameter EAP answer (DEA) message. The DEA message identifies AAA server 104 as the origin host. The origin realm parameter is set to the realm of AAA server 104. The session ID parameter mirrors the session ID received in the DER message (message 3). The user name is set to the user name value received in the DER message. The EAP payload contains the authentication challenge information. The result code in this example indicates that an authentication record was successfully located. If an authentication record did not exist for the subscriber, the result code would indicate an authentication error or subscriber not found.

DSR 102 receives the DEA message. DRL 302 triggers RD-IWF 310 to perform Diameter to RADIUS mediation for the received DEA message. RD-IWF 310 determines based on the message type and the message destination that the egress protocol is RADIUS and sends the message to RCL 300. The message sent to RCL 300 may be the received DEA message with an added parameter identifying the DEA message as carrying RADIUS content. RCL 300 receives the DEA message and formulates message 6, which is a RADIUS access challenge message. The RADIUS access challenge message includes the user name, the EAP message from AAA server 104, the session ID for the authentication session assigned by RD-IWF 310. The DEA message also includes an origin host parameter identifying the origin host as AAA server 104. RCL 300 forwards the access challenge message to BNG 100.

Upon receiving the RADIUS access challenge message, BNG 100 forwards the authentication challenge information to the user device seeking authentication. The user device provides the challenge response information to BNG 100. BNG 100 formulates and sends message 7, which is a RADIUS access request message, to RCL 300. The access request message contains the same state as the access challenge message and the other attributes specified in message 1. The EAP payload in the access request message may carry the access challenge information.

Upon receiving the access request message, DSR 102 provides the message to RCL 300, which encapsulates the access request message in message 8, which is a Diameter DER message with the proprietary parameter identifying the message as containing RADIUS content. Mediation function 308 triggers RD-IWF 310 to process the DER message. RD-IWF 310 formulates message 9, which is a Diameter DER message. The Diameter DER message includes a destination host parameter obtained from a state AVP parameter, which the DSR sends to BNG 100 and BNG 100 echoes back. In this example, the destination host parameter would identify AAA server 104 as the destination host for the DER message. The session ID is the DER message is set to the session ID for the authentication session. The DER message includes the EAP payload, including the challenge response information from the user device. The other AVPs in the DER message may be the same as those in message 3. RD-IWF 310 may forward the DEA message to DRL 302, which routes the DER message (message 10) to AAA server 104.

Upon receiving the DER message, AAA server 104 extracts the EAP payload from the message, determines whether the authentication response information in the EAP payload matches the expected response, and determines an authentication result (i.e., successful or unsuccessful authentication). In this example, it is assumed that the authentication is successful. Accordingly, AAA server 104 formulates message 10, which is a DEA message, including a result code indicating successful authentication. The DEA message may also include an EAP payload and other parameters. AAA server 104 forwards the DEA message to DSR 102.

Upon receiving the DEA message, DRL 302 triggers RD-IWF 310 to perform a full translation of the DEA message. RD-IWF determines that the message is destined to a RADIUS destination, so RD-IWF 310 forwards the DEA message to RCL 300 for transmission of the corresponding RADIUS message. The DEA message may include a parameter indicating that the message carries RADIUS content. RCL 300 receives the DEA message, formulates a RADIUS access accept message including the EAP payload from the DEA message and forwards the access accept message to BNG 100. BNG 100 then informs the user device that authentication was successful. Thus, using the steps illustrated in FIG. 4, a user device can be seamlessly authenticated to a core network that uses Diameter.

Table 1 shown below illustrates exemplary parameter mapping between a RADIUS access request message and a Diameter DER message that may be performed by RD-IWF 310.

TABLE 1

RADIUS Access Request to Diameter DER Parameter Mappings

| Diameter AVP | Value | SWa | STa | Notes |
|---|---|---|---|---|
| Destination-Host | Blank if State not present in Access-Request. Taken from value of State if present in Access-Request. | O | O | Needed in non-initial Access-Request messages in order to ensure they are routed to same AAA server. |
| Session-ID | Generated by DSR if State not present in Access-Request. Taken from value of State if present in Access-Request. | M | M | Must be same value for the life of the authentication session. |
| Auth-Application-ID | STa | M | M | Used by both STa and SWa. |
| Auth-Request-Type | AUTHORIZE_AUTHENTICATE | M | M | |
| EAP-Payload | RADIUS EAP-Message attribute | M | M | |
| User-Name | RADIUS User-Name attribute | M | M | |
| Calling-Station-ID | RADIUS Calling-Station-ID | M | M | |
| RAT-Type | RADIUS NAS-Port-Type | C | M | |
| ANID | Mapped from RADIUS NAS-Port-Type | O | M | Included if access net selects EAP-AKA' authentication (most likely). |

In Table 1, values for Diameter AVPs formulated based on a received RADIUS access request message are illustrated. In the Table "O" stands for optional and "M" stands for mandatory.

Table 2 shown below illustrates exemplary values for RADIUS attributes that may be populated from a received Diameter message.

TABLE 2

Diameter DER AVPs for RADIUS Access Challenge Accept or Reject Message

| RADIUS attribute | Value | Notes |
| --- | --- | --- |
| User-Name | Diameter User-Name AVP | |
| EAP-Message | EAP-Payload | |
| State | Diameter Session-ID + Origin-Host (of AAA server) | |
| Message-Authenticator | Added if configured by user | RFC 3579 says this is mandatory in RADIUS message for EAP |

Figure 5:
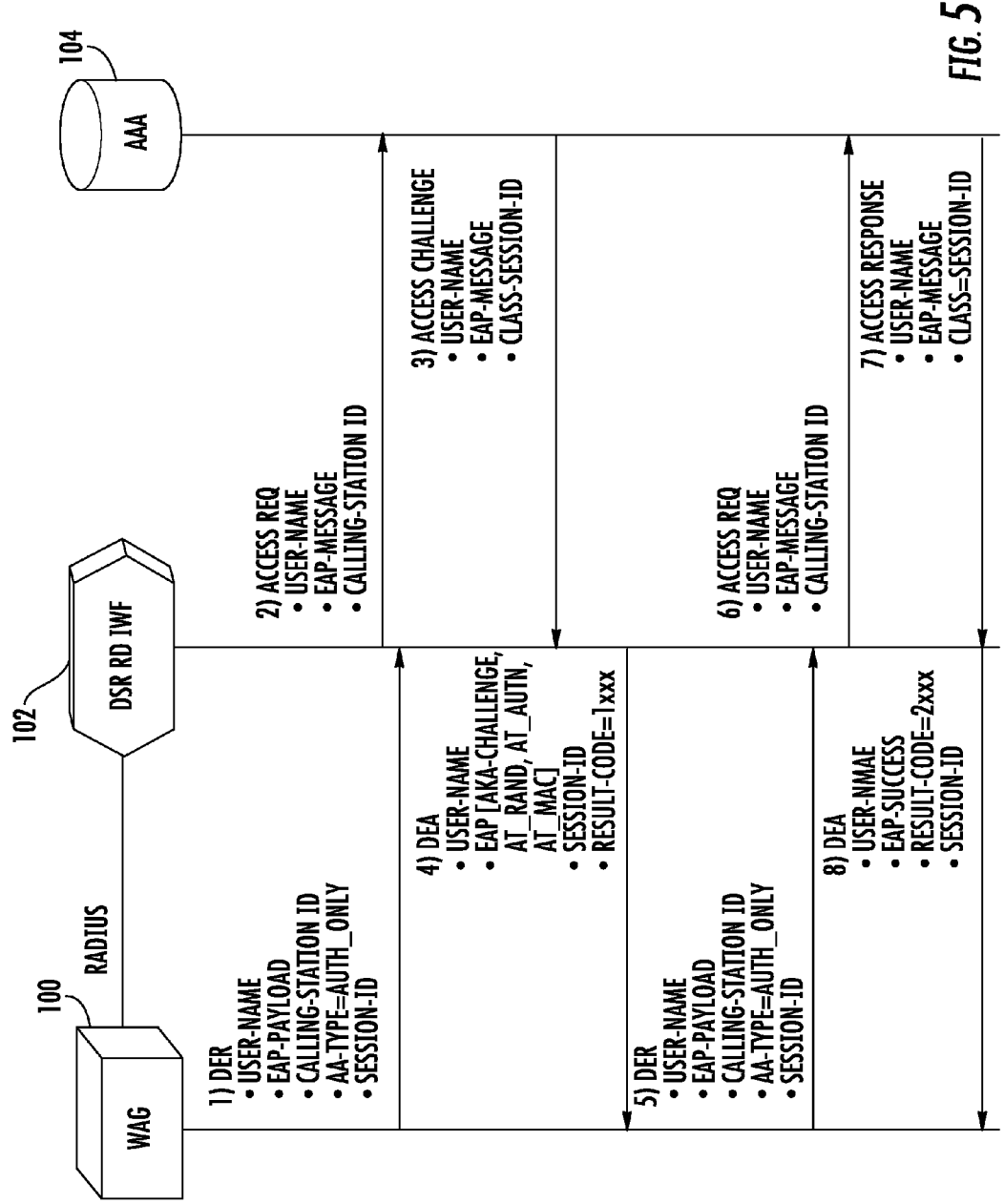
FIG. 5 is a message flow diagram illustrating exemplary message exchanges for Diameter-RADIUS interworking for user authentication according to an embodiment of the subject matter described herein.

In FIG. 3, DSR 102 performs signaling protocol interworking when the access network protocol is RADIUS and the cellular or core network protocol is Diameter. DSR 102 may also perform access network protocol interworking for authentication when the access network protocol is Diameter and a core network protocol is RADIUS. FIG. 5 illustrates such an example. Referring to FIG. 5, a wireless access gateway may initiate authentication with an AAA server when a user device connects to the access network that supports automatic authentication as described herein. Accordingly, wireless access gateway 100 formulates message 1 which is a DER message. The DER message includes the user name, an EAP payload, the calling station ID, an AA type parameter set to authentication only, and a session identifier. It should be noted that the messages illustrated in FIG. 5 may include other AVPs or parameters in addition to those illustrated. WAG 100 sends the DER message to DSR 102.

DSR 102 receives the DER message and, because the cellular network protocol is RADIUS, formulates message 2, which is a RADIUS access request message. The RADIUS access request message includes the user name, the EAP payload from the DER message, and the calling station ID. DSR 102 forwards the access request message to AAA server 104.

AAA server 104 receives the access request message and uses the calling station ID to perform a lookup in its subscriber database. In this example, it is assumed that AAA server 104 locates a record corresponding to the calling station. Accordingly, AAA server 104 formulates message 3, which is a RADIUS access challenge message. The access challenge message includes the user name, an EAP payload, and a session identifier. The EAP payload may include access challenge information. AAA server 104 sends the access challenge message to DSR 102.

DSR 102 receives the RADIUS access challenge message, determines that the outbound message should be a Diameter message, and formulates message 4, which is a Diameter DEA message. The DEA message includes the user name, an EAP payload including the access challenge information, the session identifier, and a result code that indicates whether the authentication lookup was successful. DSR 102 forwards the DEA message to WAG 100.

WAG 100 receives the DEA message, removes the access challenge information, and provides the access challenge information to the user device seeking authentication. The user device sends access challenge response to information to WAG 100. WAG 100 formulates a Diameter DER message including EAP payload that carries the challenge response information. The DER message also includes a user name, the calling station ID, an AA type parameter set to authentication only, and a session identifier. WAG 100 sends the DER message to DSR 102.

DSR 102 receives the DER message, determines that the outbound message should be a RADIUS message, and formulates message 6, which is a RADIUS access request message. The RADIUS access request message includes the EAP payload with the challenge response information, a user name, and a calling station ID. DSR 102 forwards the access request message to AAA server 104.

AAA server 104 receives the access request message, performs a lookup in its database to determine whether the challenge response information is equal to an expected response, and formulates a message 7, which is a RADIUS access response message. The RADIUS access response message includes an EAP payload that indicates results of the authentication, a user name, and the session ID. AAA server 104 sends the access response message to DSR 102.

DSR 102 receives the access response message, determines that the outbound message should be a Diameter message, and formulates a Diameter DEA message. The DEA message includes an EAP payload indicating successful authentication and a result code also indicating successful authentication. The DEA message also includes a user name and a session identifier. DSR 102 sends the DEA message to WAG 100.

WAG 100, upon receiving the DEA message, communicates with the user device to indicate that the authentication to the network is successful. After successful authentication, the user device can access the wireless access network as well as core network services.

Figure 6:
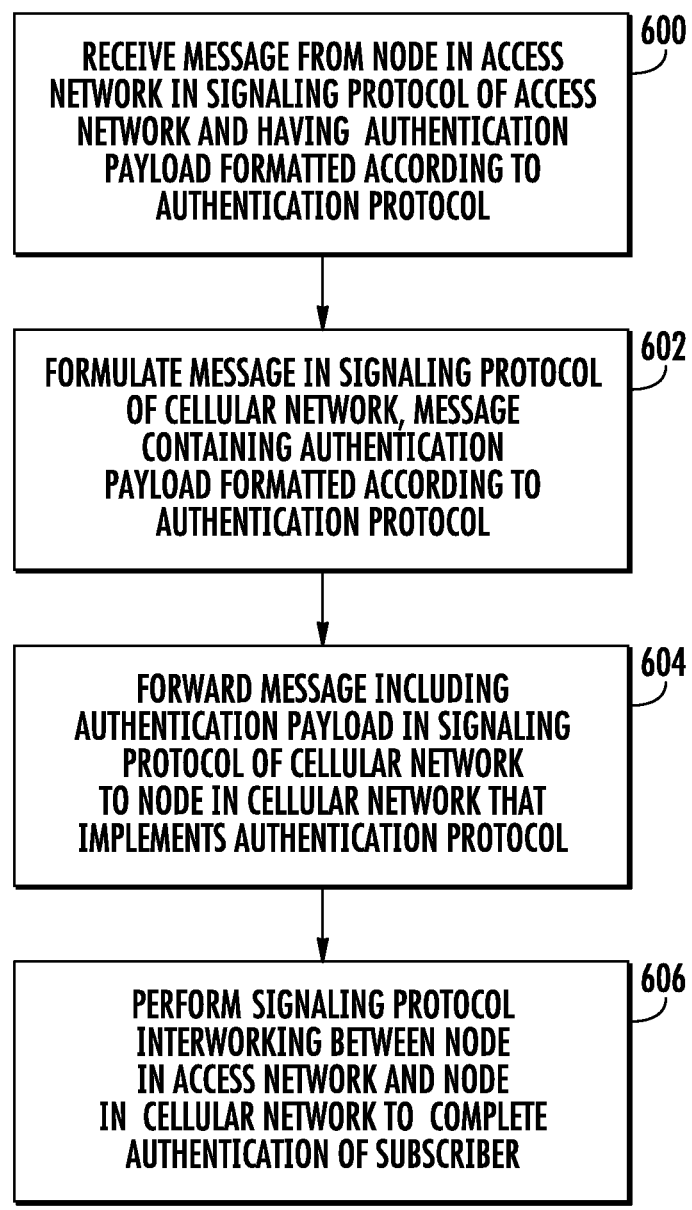
FIG. 6 flow chart illustrating exemplary steps for access network signaling protocol interworking for user authentication according to an embodiment of the subject matter described herein.

FIG. 6 is a flow chart illustrating an exemplary process for access network signaling protocol interworking for user authentication according to an embodiment of the subject matter described herein. Referring to FIG. 6, in step 600, a message is received from a node in an access network. The message may be formatted in the signaling protocol of the access network and may include an authentication payload formatted according to an authentication protocol. For example, DSR 102 may receive a RADIUS message or a Diameter message including an EAP payload. In step 602, a message is formulated in the signaling protocol of a cellular network, where the message contains the authentication payload formatted according to the authentication protocol. For example, DSR 102 may forward a RADIUS or Diameter message, depending on the protocol used by the cellular network. The RADIUS or Diameter message may include the EAP payload from the received Diameter or RADIUS message.

In step 604, a message including the authentication payload and in the signaling protocol of the cellular network is forwarded to a node in the cellular network that implements the authentication protocol. For example, DSR 102 may forward a RADIUS or Diameter message with the EAP payload to AAA server 104.

In step 606, protocol interworking is performed between the node in the access network and the node in the cellular network to complete authentication of a subscriber according to the authentication protocol. For example, DSR 102 may convert between Diameter and RADIUS for subsequent message exchanges relating to authenticating a subscriber to the network. The authentication protocol may be any suitable authentication protocol, for example, EAP. Examples of such exchanges are illustrated in FIGS. 3 and 5.

In one exemplary implementation, the authentication protocol is implemented end to end between the node in the access network and the node in the cellular network. As a result, DSR 102 may perform the signaling protocol interworking to authenticate a subscriber while remaining stateless with respect to the authentication protocol.

Figure 7:
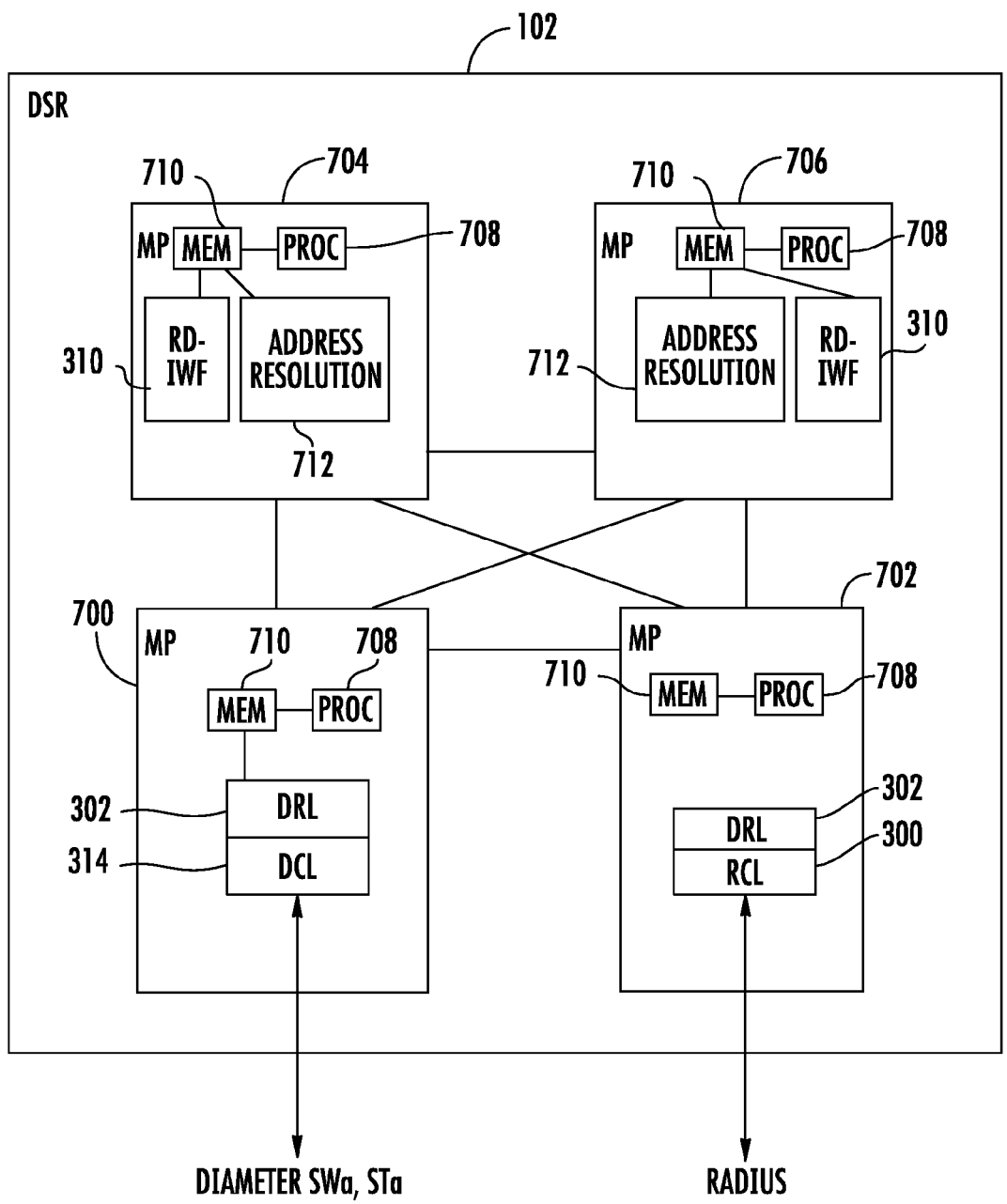
FIG. 7 is a block diagram of a DSR implementing access network signaling protocol interworking for user authentication according to an embodiment of the subject matter described herein.

As stated above, access network protocol interworking as described herein may be implemented on a DSR. FIG. 7 is a block diagram illustrating an exemplary architecture for DSR that implements access network protocol interworking according to an embodiment of the subject matter described herein. Referring to FIG. 10, DSR 102 includes a plurality of message processors 700, 702, 704, and 706 that perform various functions associated with Diameter routing, address resolution, and protocol interworking. Each message processor 700, 702, 704, and 706 may be implemented as a printed circuit board or blade that includes at least one processor 708 and memory 710. Message processors 700, 702, 704, and 706 may be connected to each other via a bus or other suitable internal connection. Each of message processors 700, 702, 704, and 706 may include a hypervisor (not shown) to virtualize access to underlying hardware resources so that the access network protocol interworking and other components described herein can operate in virtual machine environments.

In the illustrated example, message processor 700 includes Diameter connection layer (DCL) 314 and DRL) 302. DCL 314 performs functions for establishing Diameter connections with other nodes over Diameter interfaces, such as SWa and STa interfaces. DRL 302 routes messages based on Diameter level information in the messages.

Message processor 702 includes RADIUS connection layer (RCL) 306 that establishes and maintains RADIUS connections with other nodes. RCL 306 encapsulates received RADIUS messages in Diameter messages, as described above. Message processor 702 also includes DRL 302 that routes Diameter messages based on Diameter level information. DRL 302, in one implementation, may also determine whether received messages require processing by interworking function 310.

Message processor 704 includes an address resolution module 712 that performs range based address resolution and individual subscriber identifier address resolution for RADIUS and Diameter messages. Such address resolution may include performing a lookup based on an international mobile station identifier (IMSI) or a mobile subscriber integrated services digital network (MSISDN) number in a message to determine the appropriate destination for the message and inserting the routing information in the messages for routing the messages to the appropriate destination. Message processor 704 may also include an RD interworking function 310 that performs the protocol interworking functions described herein. For example, RD interworking function 310 may perform the access network protocol interworking described above with respect to FIG. 3 or FIG. 5. Message processor 706 may be identically provisioned to message processor 704 and may be provided for redundancy or load sharing purposes.

Thus, when a Diameter message arrives at message processor 700, DRL 302 determines whether signaling protocol interworking processing is required. If signaling protocol interworking is required, DRL 302 sends the message to one of message processors 704 and 706 for protocol interworking. RD IWF 310 on the receiving message processor performs the required signaling protocol interworking and formulates the outbound message. Address resolution may be performed to determine the routing information for the outbound message. RD IWF 310 or address resolution module 712 forwards the message to the appropriate message processor 700 or 702 which forwards the message to its intended next hop.

Accordingly, the architecture illustrated in FIG. 7 is a special purpose machine that performs access network signaling protocol interworking for authenticating users on different types of access networks using plural different types of cellular network authentication interfaces. The architecture illustrated in FIG. 7 improves the functionality of both access and cellular networks by seamlessly authenticating user devices to those networks without requiring that the access network and the core cellular network use the same signaling protocol to carry authentication information.

In addition, because the authentication protocol is implemented end-to-end between the access network and the authenticating server in the cellular network, the signaling protocol interworking can be performed statelessly with respect to the authentication protocol. Stateless signaling protocol interworking may simplify the design and/or implementation of the protocol interworking function.

What is claimed is:

1. A method for access network signaling protocol interworking for user authentication, the method comprising:
    in a Diameter signaling router (DSR) including at least one message processor:
        receiving, from a node in an access network, a message formatted according to a signaling protocol of the access network and containing an authentication payload formatted according to an authentication protocol, wherein the signaling protocol of the access network comprises a Diameter protocol, the node in the access network comprises a wireless access gateway (WAG), and the message formatted according to the signaling protocol of the access network comprises a Diameter extensible authentication protocol (EAP) request (DER) message;
        in response to receiving the DER message, formulating a message formatted according to a signaling protocol of a cellular network, the message including the authentication payload formatted according to the authentication protocol;
        forwarding the message formatted according to the signaling protocol of the cellular network to a node in the cellular network that implements the authentication protocol, the message including the authentication payload formatted according to the authentication protocol, wherein the signaling protocol of the cellular network comprises a remote access dial in user service (RADIUS) protocol, the node in the cellular network comprises an authentication, authorization, and accounting (AAA) server, and the message formatted according to the signaling protocol of the cellular network comprises a RADIUS access request message.

2. The method of claim 1 wherein the Diameter protocol comprises a Diameter SWa protocol.

3. The method of claim 1 wherein the Diameter protocol comprises a Diameter STa protocol.

4. The method of claim 1 wherein the authentication protocol comprises an EAP protocol.

5. The method of claim 1 wherein the authentication protocol is implemented end to end between the node in the access network and the node in the cellular network.

6. The method of claim 5 wherein the Diameter signaling router is stateless with respect to the authentication protocol.

7. A system for access network signaling protocol interworking for user authentication, the system comprising:

a Diameter signaling router (DSR) including at least one message processor:

an interworking function in the DSR and implemented by the at least one processor for receiving, from a node in an access network, a message formatted according to a signaling protocol of the access network and containing an authentication payload formatted according to an authentication protocol, for, in response to receiving the message, formulating a message formatted according to a signaling protocol of a cellular network, the message including the authentication payload formatted according to the authentication protocol, and for forwarding the message formatted according to the signaling protocol of the cellular network to a node in the cellular network that implements the authentication protocol, the message including the authentication payload formatted according to the authentication protocol, wherein the signaling protocol of the access network comprises a Diameter protocol, the signaling protocol of the cellular network comprises a remote dial in user service (RADIUS) protocol, the node in the access network comprises a wireless access gateway (WAG), the message formatted according to the signaling protocol of the access network comprises a Diameter extensible authentication protocol (EAP) request (DER) message, the node in the cellular network comprises an authentication, authorization, and accounting (AAA) server, and the message formatted according to the signaling protocol of the cellular network comprises a RADIUS access request message.

8. The system of claim 7 wherein the Diameter protocol comprises a Diameter SWa protocol.

9. The system of claim 7 wherein the Diameter protocol comprises a Diameter STa protocol.

10. The system of claim 7 wherein the authentication protocol comprises an EAP protocol.

11. The system of claim 10 wherein the authentication protocol is implemented end to end between the node in the access network and the node in the cellular network.

12. The system of claim 10 wherein the Diameter signaling router is stateless with respect to the authentication protocol.

13. A non-transitory computer readable medium having stored thereon executable instructions that when executed by the processor on a computer control the computer to perform steps comprising:

in a Diameter signaling router (DSR) including at least one message processor:

receiving, from a node in an access network, a message formatted according to a signaling protocol of the access network and containing an authentication payload formatted according to an authentication protocol, wherein the signaling protocol of the access network comprises a Diameter protocol, the node in the access network comprises a wireless access gateway (WAG), and the message formatted according to the signaling protocol of the access network comprises a Diameter extensible authentication protocol (EAP) request (DER) message;

in response to receiving the DER message, formulating a message formatted according to a signaling protocol of a cellular network, the message including the authentication payload formatted according to the authentication protocol;

forwarding the message formatted according to the signaling protocol of the cellular network to a node in the cellular network that implements the authentication protocol, the message including the authentication payload formatted according to the authentication protocol, wherein the signaling protocol of the cellular network comprises a remote access dial in user service (RADIUS) protocol, the node in the cellular network comprises an authentication, authorization, and accounting (AAA) server, and the message formatted according to the signaling protocol of the cellular network comprises a RADIUS access request message.

\* \* \* \* \*

UNITED STATES PATENT AND TRADEMARK OFFICE
CERTIFICATE OF CORRECTION

PATENT NO. : 9,930,528 B2  
APPLICATION NO. : 15/582503  
DATED : March 27, 2018  
INVENTOR(S) : McCann Page 1 of 1

It is certified that error appears in the above-identified patent and that said Letters Patent is hereby corrected as shown below:

On the Title Page

Page 3, Column 2, Line 52, delete "Applicaton.No." and insert -- Application No. --, therefor.

Page 5, Column 2, Line 52, delete "tellecommunications" and insert -- telecommunications --, therefor.

Page 6, Column 1, Line 62, delete "com." and insert -- com/ --, therefor.

Page 6, Column 2, Line 49, delete "Inc." and insert -- Inc., --, therefor.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*